United States Patent [19]
Gary et al.

[11] 4,347,540
[45] Aug. 31, 1982

[54] SOLID-STATE LOAD PROTECTION SYSTEM HAVING GROUND FAULT SENSING

[75] Inventors: Wardell Gary, Oak Park, Mich.; Ernest F. Conroy, Jr., Monroeville, Pa.

[73] Assignee: Westinghouse Electric Corp., Pittsburgh, Pa.

[21] Appl. No.: 258,106

[22] Filed: Apr. 27, 1981

[51] Int. Cl.³ .............................................. H02H 3/16
[52] U.S. Cl. ....................................... 361/47; 361/42
[58] Field of Search ...................... 361/42, 47, 48, 49, 361/50

[56] References Cited

U.S. PATENT DOCUMENTS

| | | | |
|---|---|---|---|
| 3,602,783 | 8/1971 | Engle et al. | 361/96 |
| 3,818,275 | 6/1974 | Shimp | 361/94 |
| 3,996,499 | 12/1976 | Gary et al. | 361/95 |
| 4,021,703 | 5/1977 | Gary et al. | 361/85 |
| 4,115,829 | 9/1978 | Howell | 361/42 |
| 4,271,444 | 6/1981 | Howell | 361/48 |

Primary Examiner—Reinhard J. Eisenzopf
Attorney, Agent, or Firm—Donald M. Boles

[57] ABSTRACT

A solid state load protection system whereby the current supplied to a load is monitored enabling ground fault sensing to be used. A current sensor is utilized so as to produce an output current which is proportional to the current in the electrical circuit. Attached to the current sensing function is a resistive load which converts the current produced by the current sensing function to a voltage which is also proportional to the current utilized by the motor. Attached between two resistors which comprise the resistive load is a ground fault resistor which has its remaining end connected to the neutral leg of the current transformers of the current sensing function. The ground fault sensor monitors the voltage across the resistors in the resistive load and the current in the neutral leg of the current sensors. A ground fault condition is indicated when a current in the neutral leg of the current sensor is detected and thereby causes voltages across each of the resistive load resistors to be unequal to each other. If this condition is in excess of a predetermined level, for a predetermined period of time a trip signal to the output function is initiated, in turn causing a light-emitting diode to conduct and indicating a ground fault condition. The output function upon receiving a trip signal causes a second light-emitting diode to conduct and also de-energizes a contactor through which a current source is connected to a load.

38 Claims, 6 Drawing Figures

SOLID-STATE LOAD PROTECTION SYSTEM HAVING GROUND FAULT SENSING

CROSS-REFERENCE TO RELATED APPLICATIONS

The present invention is related to material disclosed in the following concurrently filed copending U.S. Patent Applications, all of which are assigned to the same assignee as the present application.

Ser. No. 258,093, "Solid-State Load Protection System Having a Test Feature" filed Apr. 27, 1981 by E. F. Conroy, Jr.;

Ser. No. 258,107, "Solid-State Load Protection System Having an Improved Inverse Time Delay Circuit" filed Apr. 27, 1981 by E. F. Conroy, Jr. and R. T. Elms;

Ser. No. 258,108, "Solid-State Load Protection System Having Loss of Phase Sensing" filed Apr. 27, 1981 by E. F. Conroy, Jr., D. P. Orange, and R. T. Elms;

Ser. No. 258,092, "Solid-State Load Protection System Having Electronic Simulation of Motor Heating" filed Apr. 27, 1981 by R. T. Elms and E. F. Conroy, Jr.

BACKGROUND OF THE INVENTION

1. Field of the Invention

This invention relates, generally, to solid state load protection systems and more particularly to ground fault sensing enabling the system to detect a ground fault which is in excess of a predetermined value for a predetermined period of time and to thereby cause a trip signal to be generated so as to deenergize a load.

2. Description of the Prior Art

It is known that some load protection systems have various protection functions such as current overload, phase loss, and ground fault sensing. These functions generally provide a trip time for a circuit breaker and associated load which is inversely related to the square of the current flowing in the load to be protected. Therefore, an inverse time relationship is generally utilized whereby the time between a fault which is sensed and trip out are inversely related such that a high overcurrent will result in a very short period of time for device trip out and a relatively low overcurrent fault will result in a substantially longer time before trip out. Types of devices which accomplish the above can be found in U.S. Pat. No. 4,021,703, "Phase Imbalance Detection Circuit", issued May 3, 1977 to Gary, et al; U.S. Pat. No. 3,996,499, "Zener Diode Effect on Long Acceleration Module", issued Dec. 7, 1976 to Gary, et al.; U.S. Pat. No. 3,818,275, "Circuit Interrupter Including Improved Trip Circuit Using Current Transformers", issued June 18, 1974 to Shimp and U.S. Pat. No. 3,602,783, "Circuit Breaker Device Including Improved Overcurrent Protective Device", issued Aug. 31, 1971 to Engle, et al., all assigned to the assignee of the present invention. However, the above-mentioned patents do not generally provide ground fault sensing as part of a protective system or require the use of an additional current transformer.

It is desirable to have a ground fault sensing system which the user may use with a load protection system and is more simple to use. It is also desirable to have a ground fault sensing system which does not require the substantial addition of components or which must be permanently wired into a load protection system or that require the partial or complete dismantling of a load protection system.

SUMMARY OF THE INVENTION

Briefly stated, a solid-state load protection system is used for detecting ground fault conditions. A sensor is used to sense the circuit current in an electrical circuit. The sensor has a pair of output terminals providing an output signal which is related to the circuit current and also has a neutral leg. A pair of resistive elements which are serially connected with each other are connected across the output terminals of the sensor. A conductive element is connected at one end between a pair of resistive elements and at the other end to the neutral leg. A ground fault sensor is then connected across the output terminals of the sensor and the neutral leg, thereby detecting current flow in or voltage across the conductive element during a ground fault condition. This results in unequal voltages across the pair of resistive elements which may also be used to detect a ground fault condition. The ground fault sensor upon detecting a ground fault condition initiates a trip signal. A circuit control trip device is connected to the ground fault sensor and to the electrical circuit thereby opening the electrical circuit when receiving a trip signal generated by the ground fault sensor.

BRIEF DESCRIPTION OF THE DRAWINGS

Reference is now made to the description of the preferred embodiment, illustrated in the accompanied drawings, in which.

DESCRIPTION OF THE PREFERRED EMBODIMENTS

Figure 2:
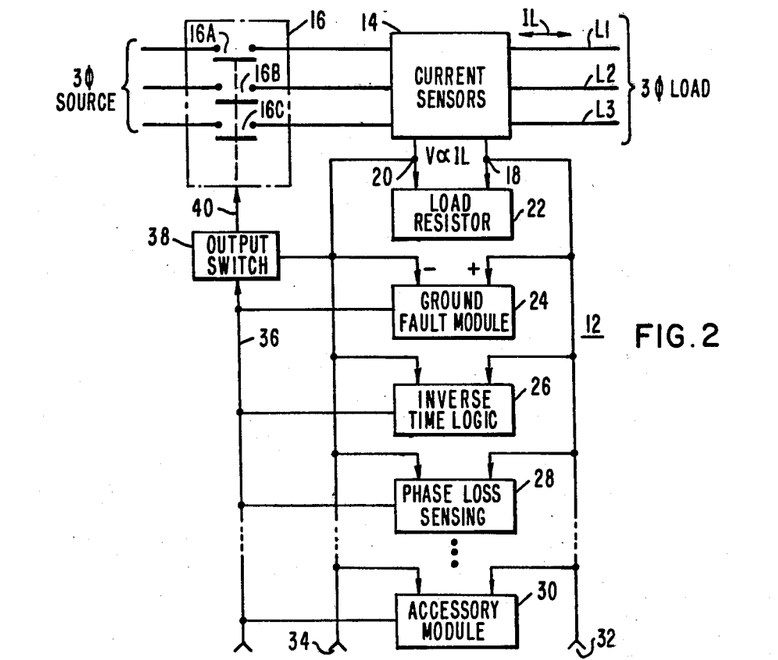
FIG. 2 is a block diagram 3-phase representation of a contactor including the solid-state load protection system of the present invention.

Referring now to the drawings and FIG. 2 in particular, a circuit protective system 12 is shown. The circuit protective system 12 comprises in this embodiment of the invention a three-phase line having conductors or lines L1, L2 and L3 which are connected on the right to a three-phase load and which are connected on the left to a three-phase source of electrical power. Intermediate to the load and the source of electrical power is a current sensor 14 and a serially connected circuit breaker or motor contactor apparatus 16. In the embodiment of FIG. 2 a single current IL is shown flowing in the line L1. It is to be understood that other currents may and usually do flow in the other lines L2 and L3 and the other current may be related to the current IL. The choice of current IL is merely made for the purpose of simplicity of illustration.

There are two output terminals for the current sensor 14, which terminals are designated 18 and 20. Shown connected to the terminals 18 and 20 is a load resistor module 22. The load resistor module 22 comprises a resistive element which is connectable across the terminals 18 and 20 to convert the current IL into a utilizable voltage V which may be utilized by other circuit protective means in the apparatus of FIG. 2. Connected in parallel circuit relationship with the load resistor module 22 may be a ground fault module 24, inverse time logic 26, loss of phase sensing 28, and an accessory module 30 which may include such items as a field test panel, an overload condition indicator or long acceleration modules, described more fully in U.S. Pat. No. 3,996,499 mentioned earlier. The remaining elements would be connected to terminals 32 and 34 for example. It is to be understood that modules 24 and 30 may be removed or replaced and other modules may be added provided the parallel circuit relationship with the load resistor module 22 is maintained. Each of the previously described circuits 24, 26, 28 and 30 for example have an output terminal which is connectable to a line 36 which in turn is connected to an output switch 38 which controls the line 40 and in turn is connected to the previously described circuit breaker or motor contactor apparatus 16. In the preferred embodiment of the invention, the voltage V at the output terminals 18 and 20 is proportional to the current IL. If the anticipated rise of current IL becomes significantly large a different load resistor may be disposed across terminals 18 and 20 to make the voltage between the terminals approximately the same even though the current IL is significantly larger. The same compensation by substitution of an appropriate resistor would apply if the rated current range is significantly lower. This means that the elements 24 through 30 need not be changed as they are sensitive only to the voltage V. It also means that the output switch 38 need not be changed. Therefore the resistive value of the load resistor 22 is varied so that the voltage V across terminals 18 and 20 are at approximately the same level regardless of the IL characteristics of the load, when the load is at 100% rating. The inverse time logic 26 provides what is typically known as the $I_2T$ function and is well known in the art. Briefly stated, the inverse time logic 26 will produce an output at a period of time which varies with the value of the voltage V appearing at its input.

Figure 1:
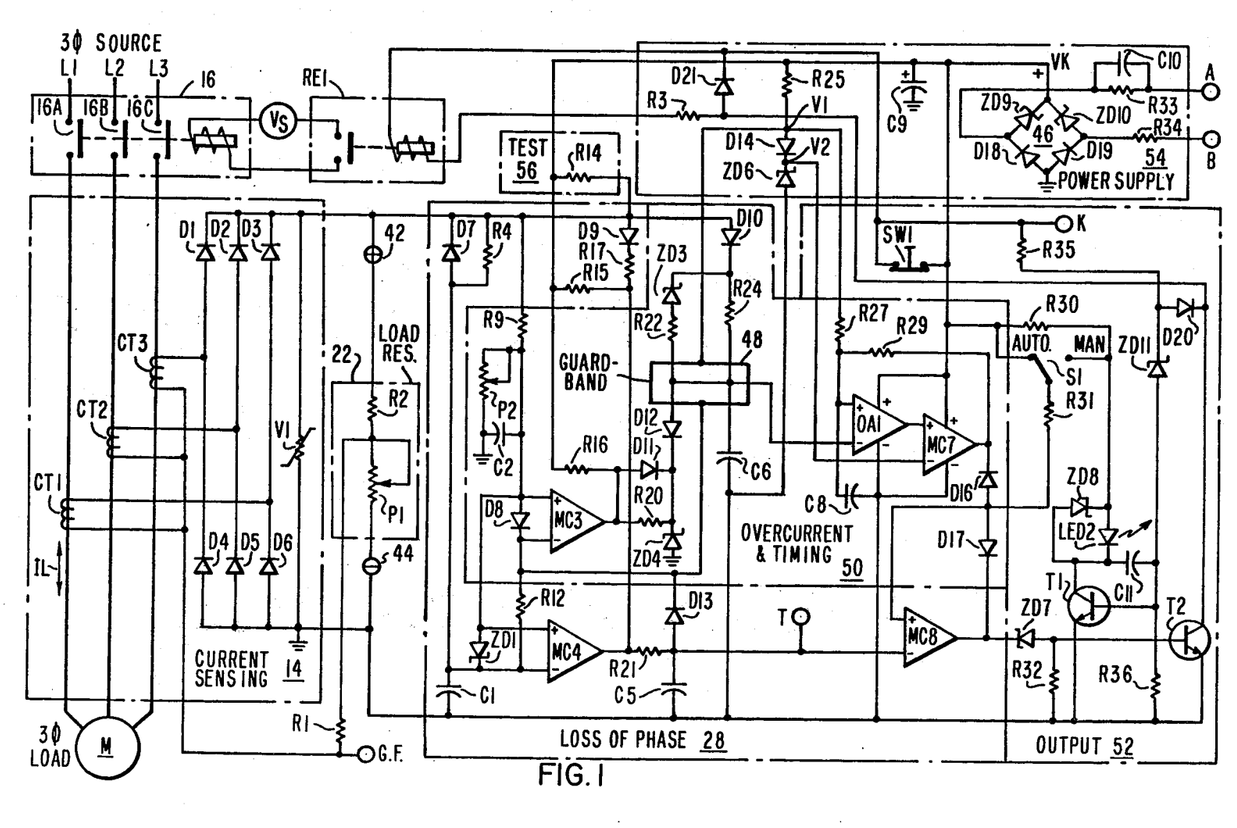
FIG. 1 is a schematic diagram of the solid-state load protection system of the present invention including a portion of the external electrical system or circuit.
Figure 1A:
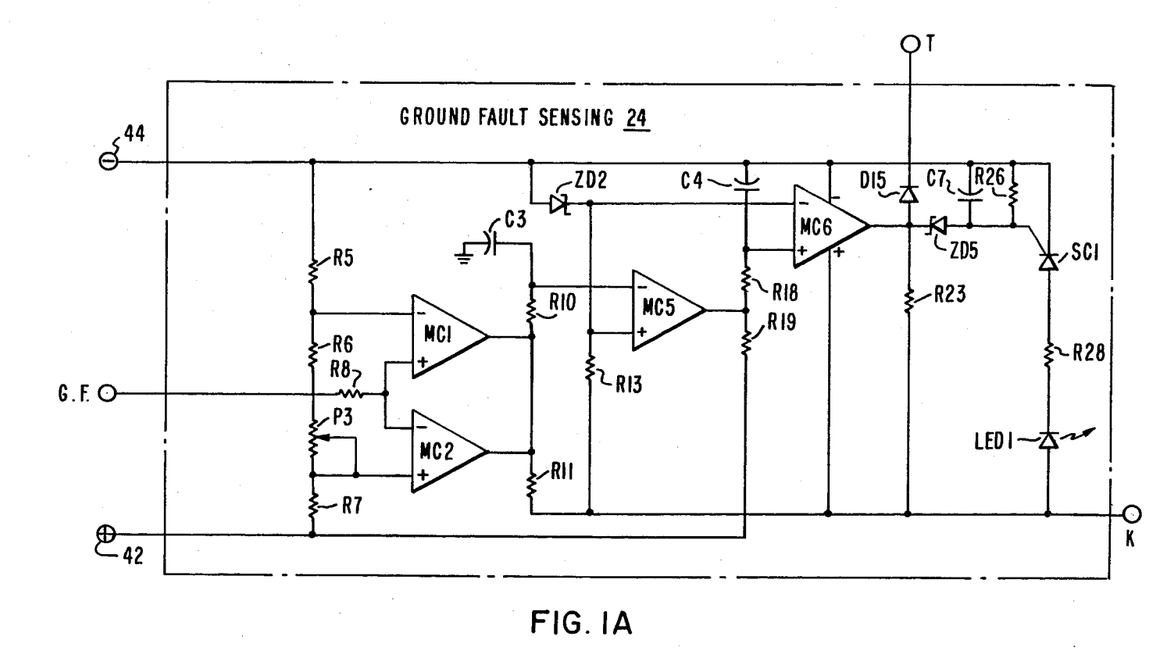
FIG. 1A is a schematic diagram of the ground fault sensing circuit of the present invention.
Figure 5:
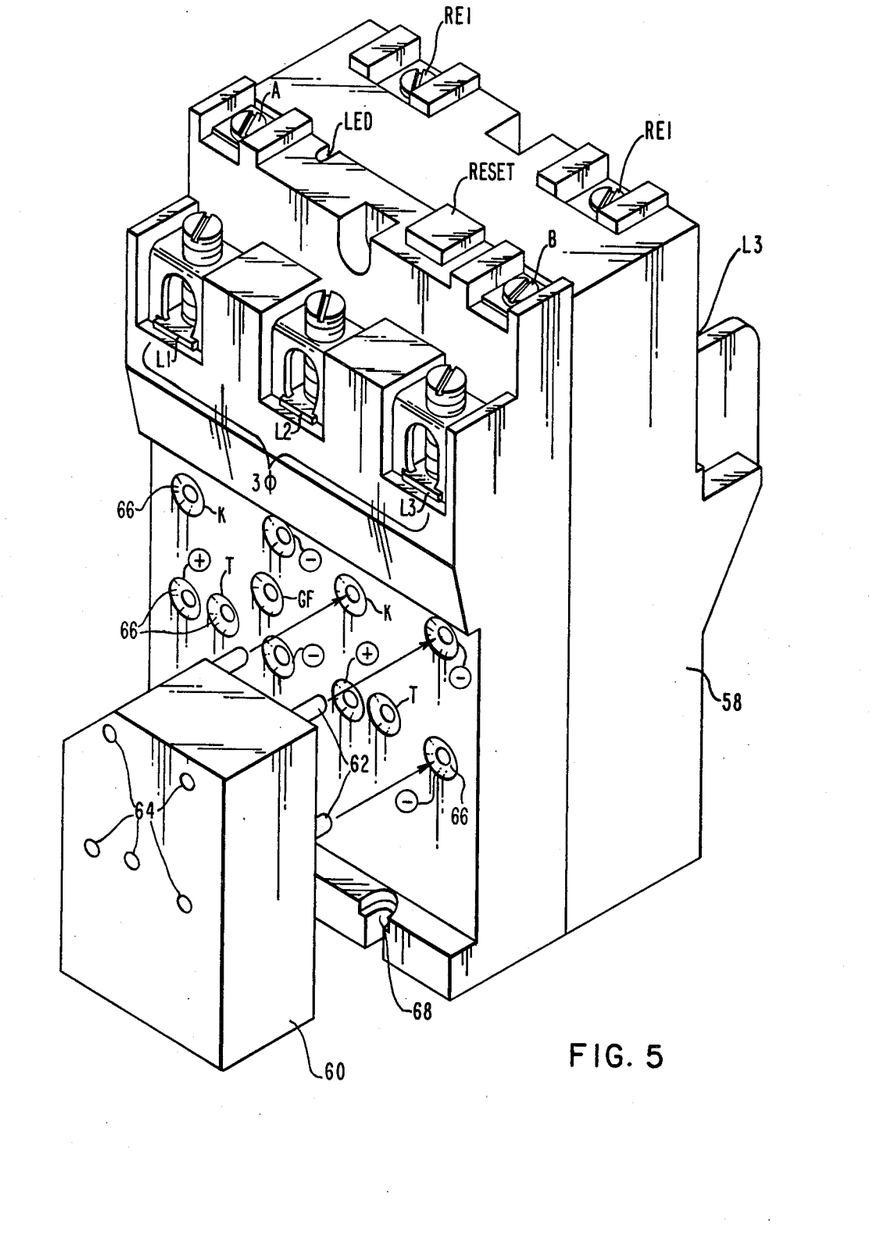
FIG. 5 is an illustration of the physical interconnecting plan for the apparatus shown in FIGS. 1, 1A and 2.

Referring now to FIG. 5, there is shown the physical interconnecting plan for the apparatus shown in FIGS. 1, 1A and 2. Shown is the protective system enclosure 58 which houses the electronics shown in FIG. 1 with the exception of the circuit breaker or motor contactor apparatus 16, the load M and the load resistor module 22. The power for the circuitry is applied to terminals A and B at the top of the enclosure 58, with the reset button and the trip indicator LED2 being adjacent thereto. The contacts for the relay RE1 are also on the top of the enclosure 58. The line conductors L1, L2 and L3 pass through current transformers contained in the enclosure 58 allowing the load protection system to be serially inserted in the electric circuit. Modules 60, such as that shown in FIG. 5, having module pins 62 are configured so as to correspond with the protective system breakout terminals 66. The protective system breakout terminals 66 are configured so as to permit insertion of module 60 in only one possible way. These protective system breakout terminals 66 are utilized by the modules 60 to exercise functions over the circuit protective system. On the back of the modules 60 are module pass-through pins 64 which allow other similar modules 60 to be "ganged" thereby allowing a plurality of modules 60 to be utilized. The protective system breakout terminals 66 are arranged in a redundant manner, with the exception of the ground fault GF terminal, thereby allowing the module 60 to be inserted into the left or right set of protective system breakout terminals 66. The protective system enclosure 58 is mountable by using the mounting brackets 68 to any suitable surface, thereby allowing close proximity to the equipment to be protected.

CONSTRUCTION OF THE PROTECTIVE SYSTEM

Referring to FIG. 1 there is shown an embodiment of the invention for use with a three-phase line having a three-phase source in controlling a motor M which is a three-phase load. In this embodiment of the invention, the electrical and electronic elements comprising current sensor 14, load resistor module 22, inverse time logic 50, output 52, motor contactor apparatus 16, loss of phase logic 28, power supply 54 and test 56 are shown in schematic form. In this case, a current IL flowing through the line L1 is sensed by a current transformer CT1 in the current sensor 14. The resistor R2 in series circuit relationship with the potentiometer P1 shown in the load resistor module 22, comprises the load resistor module 22 previously described and it is across this module 22 that the output voltage V exists. It should be noted that potentiometer P1 may be a fixed resistor if a specific load rating is known. Similarly, in L2 and L3 the current IL flowing through the current sensor 14, having current transformers CT2 and CT3 produces a voltage across the load resistor module 22. The current induced in current transformer CT1, CT2, and CT3 is rectified in a three-phase bridge network which is comprised of diodes D1, D2, D3, D4, D5, and D6. A varistor V1 is connected across the output of the three-phase bridge network.

The neutral legs of the current transformer CT1, CT2, and CT3 are connected to one end of resistor R1 and a ground fault terminal GF. The other end of resistor R1 is connected between resistor R2 and potentiometer P1. The output of current sensor 14 essentially produces a unidirectional voltage such that the connection to resistor R2 is labeled plus terminal 42 and the connection to potentiometer P1 is designated minus terminal 44 and corresponds to the output terminals 18 and 20, respectively, of the current sensor 14. It should be noted that the minus terminal 44 and circuit ground (referred to as ground) are at the same potential. The plus terminal 42 is connected to the cathode of diode D7 one end of resistors R4, R9, and R14 and to the anodes of diodes D9 and D10. The negative terminal 44 is connected to one end of capacitor C1, C5, and C6 as well as the anode of zener diode ZD6, one end of capacitor C8, the negative power inputs of op amp OA1, and comparator MC7 and also to one end of resistors R32 and R36 and finally to the emitters of transistors T1 and T2. The anode of diode D7 is attached to the remaining end of capacitor C1 and also to the remaining end of resistor R4. Also attached to the anode of diode D7 is the cathode of zener diode ZD1, one end of resistor R12 and the negative input signal terminal of comparator MC4. Attached to the remaining end of resistor R9 is the arm and one terminal of potentiometer P2, one terminal of capacitor C2, the anode of zener diode ZD1, the positive input signal terminal of comparator MC4 and MC3 as well as the anode of diode D8. The cathode of D8 is connected to the negative input signal terminal of comparator MC3, to the remaining end of resistor R12 and one end of resistors R26 and R27, the anode of diode D14 and the cathode of diode D13. The remaining terminal of capacitor C2 is attached to the remaining terminal of potentiometer P2 and to electrical ground. Attached to the cathode of diode D9 is one end of resistor R17. The cathode of diode D10 is attached to the cathode of zener diode ZD3 and one end of resistor R24. Attached to the other end of resistor R17 is one end of resistor R15, one end of resistor R21, and the output signal terminal of comparator MC4. Attached to the other end of resistor R14 is the remaining end of resistors R15 and R25, one end of resistor R16 and capacitor C9, the positive power inputs for op amp OA1 and comparator MC7, one end of normally closed switch SW1, one end of resistor R30, and the automatic mode contact on switch S1, and finally to the cathodes of zener diodes ZD9 and ZD10 which form part of the power supply bridge circuit 46. The remaining end of resistor R16 is attached to the output signal terminal of comparator MC3, the anode of diode D11, and one end of resistor R20. The cathode of diode D11 and the remaining end of resistor R20 are attached to the cathode of diode D12 and the cathode of zener diode ZD4. The anode of diode D12 is connected to one end of the resistor R22, the remaining end of resistor R24, the negative input terminal of op amp OA1 and the remaining terminal of capacitor C6. The anode of diode D13 is connected to the remaining end of resistor R21 and capacitor C5 as well as the negative input signal terminal of comparator MC8. The negative input signal terminal of comparator MC8 is connected to the trip terminal "T". Attached to the cathode of diode D14 is the cathode of zener diode ZD6 and the negative input signal terminal of comparator MC7. Attached to the anode of zener diode ZD3 is the remaining end of resistor R22.

Encircling the connections where resistors R22 and R24, capacitor C6, the negative input signal terminal of op-amp OA1 and the anode of diode D12 meet, is a guardband. The guardband is an electrically conductive track encircling the mentioned connections on both sides of a printed circuit board which is the preferred mode of the present embodiment, with the guardband being electrically connected to the cathode of D13. The purpose of the guardband is to encircle the critical signal paths which may be affected by board impedances which may affect circuit operation. These impedances are products of such things as board construction, cleanliness and humidity. Using a guardband will minimize the possibility of board impedances between ground or supply voltages causing false signals in the circuit.

Referring now to FIG. 1A there is shown the ground fault circuitry 24 for interconnection with the circuitry shown in FIG. 1. The interconnection is accomplished by connecting the GF, −, +, T and K terminals of the ground fault circuitry 24 to the GF, −, +, T and K terminals of the schematic shown in FIG. 1.

Connected to the GF terminal of the ground fault circuitry 24 is one terminal of resistor R8, with the remaining terminal of resistor R8 being connected to the positive and negative signal input terminals of comparators MC1 and MC2, respectively. Attached to the minus (−) terminal is one end of resistor R5, the anode of Zener diode ZD2, one terminal of capacitors C4 and C7, the negative power supply input for comparator MC6, one terminal of resistor R26 and the cathode of silicon controlled rectifier SC1. Attached to the pulse (+) terminal is one terminal of resistors R7 and R19. Connected to the trip (T) terminal is the cathode of diode D15.

Attached to the remaining end of resistor R5 is the negative signal input terminal of comparator MC1 and a terminal of resistor R6. Attached to the other end of resistor R6 is one leg of potentiometer P3, while the other leg of potentiometer P3 is attached to the arm of potentiometer P3, the positive signal input of comparator of MC2 and the remaining terminal of R7. The output signal terminal of comparator MC1 is connected to the output signal terminal of comparator MC2 and to one terminal of resistors R10 and R11. The other end of resistor R10 is connected to the negative signal input terminal of comparator MC5 and one terminal of capacitor C3, while the remaining terminal of capacitor C3 is grounded. The remaining terminal of resistor R11 is attached to one terminal of resistor R13, the positive power input terminal of MC6, one terminal of resistor R23, the anode of light emitting diode LED1 and then to the K terminal. The remaining end of resistor R13 is attached to the positive signal input terminal of comparator MC5, the negative signal input terminal of comparator MC6, and the cathode of zener diode ZD2. The remaining terminal of resistor R19 is attached to the output signal terminal of comparator MC5 and one terminal of resistor R18. The remaining terminal of R18 is connected to the positive signal input terminal of comparator of MC6 and to the remaining terminal of C4. The output signal terminal of comparator MC6 is connected to the anode of diode D15 and the cathode of zener diode ZD5 and to the remaining terminal of R23. The anode of zener diode ZD5 is connected to the remaining terminal of C7, R26 and thence to the GATE of silicon controlled rectifier SC1. The positive terminal of SC1 is connected to one end of resistor R28 with the remaining end being attached to the cathode of light emitting diode LED1.

Returning to FIG. 1, the remaining terminal of capacitor C8 is connected to the positive signal input of operational amplifier OA1, the remaining terminal of resistor R27, and one terminal of resistor R29. The output terminal of operational amplifier OA1 is connected to the positive signal input of comparator MC7. The output terminal of comparator MC7 is attached to the remaining terminal of resistor R29 and to the cathode of diode D16. The positive signal input of comparator MC8 is connected to the anodes of diodes D16 and D17, and thence to one terminal of resistor R31. The remaining terminal of resistor R31 is connected to the center arm of switch S1. The output signal terminal of comparator MC8 is connected to the cathode of diode 17, and the cathode of zener diode ZD7. The anode of zener diode ZD7 is connected to the remaining terminal of R32 and to the base of NPN transistor T2. The remaining terminal of resistor R36 is connected to the base of NPN transistor T1, one terminal of capacitor C11 and to the anode of zener diode ZD11. The collector of transistor T1 is connected to the remaining terminal of capacitor C11, the anode of zener diode ZD8 and the cathode of light emitting diode LED2. The anode of light emitting diode LED2 and cathode of zener diode ZD8 are connected to the remaining end of resistor R30 and to the "manual" contact of the strapping switch S1. The cathode of zener diode ZD11 is attached to the anode of diode D20 and one terminal of resistor R35. The remaining terminal of resistor R35 is attached to the K terminal. The cathode of diode D20 is connected to the collector of transistor T2, the anode of diode D21 and one terminal of resistor R3. The remaining terminal of resistor R3 is connected to one of the coil terminals of relay RE1. The remaining coil terminal of relay RE1 is connected to the cathode of diode D21, the remaining contact of the momentary switch SW1 and thence to the K terminal. The remaining terminal of capacitor C9 is attached to ground as is also the negative terminal of power supply bridge circuit 46. One of the terminals for the AC input of power supply bridge circuit 46 is attached to one terminal of resistor R34 with the remaining terminal of resistor R34 being attached to terminal B. The remaining AC input terminal for power supply bridge circuit 46 is attached to one terminal of resistor R33 and capacitor C10 with the remaining terminals of capacitor C10 and resistor R33 being connected together and thence attached to terminal A.

The contacts of relay RE1 (see FIG. 1) are a single pole normally open set of contacts having one terminal connected to a coil terminal of motor contactor apparatus 16 with the remaining coil terminal being attached to one terminal of a voltage source $V_S$. The remaining terminal of the voltage source $V_S$ is attached to the remaining terminal of the contacts contained in relay RE1. The contacts contained in motor contactor apparatus 16, being 16A, 16B, and 16C are normally open contacts and are placed in series circuit relationship with conductors L1, L2, and L3 respectively. It is to be understood that the motor contactor apparatus 16 may utilize a standard motor starter apparatus having start and stop buttons for load control.

In the preferred embodiment of this invention, the comparators MC3, MC4, MC7, and MC8 are part of one integrated circuit package and therefore while any one of the four comparators requires a signal input only one source of operating power is required, (see Table I).

Due to the modularity of the present invention various connection points are designated so as to enable different modules to be utilized. Accordingly, to facilitate the possible interchanging of load resistor module 22, a plus terminal 42 and a minus terminal 44 are designated as previously described, and are equivalent to terminals 18 and 20 of FIG. 2. Additionally, a trip terminal entitled "T" is labeled so as to allow a trip signal to be injected thereby causing the protective system to disengage the load from the source. Also, a ground fault or terminal GF is provided where the neutral legs of the current transformer CT1, CT2, and CT3 are attached. Similarly, a supply terminal K provides power to any circuitry which may be necessary for any module.

OPERATION OF THE PROTECTIVE SYSTEM

Figure 3:
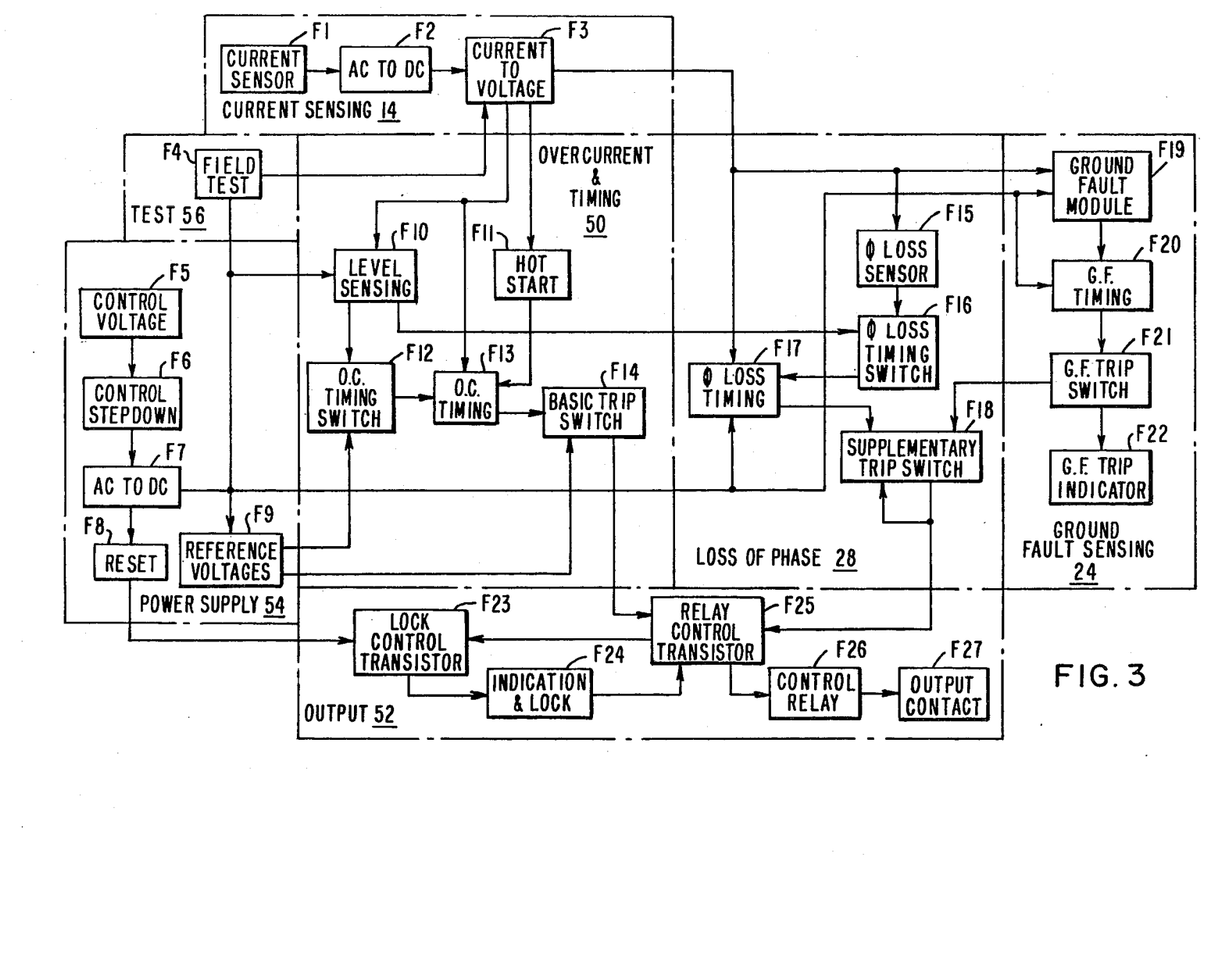
FIG. 3 is a functional block diagram of the solid-state load protection system showing signal paths for various fault conditions.

Referring now to FIG. 3, there is shown the major functions of the present invention subdivided into design elements. These elements are based on circuits at the component level and illustrate the principle signal flowpaths.

Simply stated, a power supply 54 is used to operate most of the components of the present invention. The power supply utilizes a control or input voltage F5 which may be, for example, 115 or 230 volts, at 50 or 60 Hz. The voltage is reduced or stepped down to a workable voltage F6 and rectified to a direct current (DC) supply F7 which is then supplied to various components of the test 56, overcurrent and timing 50, loss of phase 28 and ground fault sensing 24 functions. Additionally reference voltages F9 are derived from the DC supply as well as a reset path for use with the output function.

A current sensing function 14 is used to sense the level of current utilized by the load. The current sensing circuit F1 produces an AC output which is then rectified to DC F2 and changed from a current source to a voltage signal F3. Therefore, the voltage produced by the current sensing function 14 is substantially proportional to the value of the current utilized by the load. The voltage is utilized by the overcurrent and timing function 50, the ground fault sensing function 24 and the loss of phase function 28, since the current utilized by the load gives a readily usable indication of overcurrent, loss of phase and ground faults.

The overcurrent and timing logic 50 performs numerous functions. The level of the current used by the load is sensed F10 and therefore provides an overcurrent indication. The output of the level sensing output varies with the current utilized by the load whereby in the case of an overcurrent condition, initiates an overcurrent timing switch F12. If the level of current in the load exceeds a predetermined level for a predetermined period of time, a trip switch F14 is energized. Additionally, if a high inrush current is experienced by the load, the overcurrent timing F13 will start automatically. Similarly, in a hot start condition F11, when the load is warm either due to its continued operation or a previous overheating condition, the level of the start up load current is monitored so that overcurrent timing F13 can cause the trip switch F14 to trip when, as mentioned previously, the load current is in excess of a predetermined level but for a shorter predetermined period of time.

The field test function 56 allows the power supply direct current F7 to energize the overcurrent timing switch F12 of the overcurrent and timing function 50, thereby causing the basic trip switch F14 to trip, simulating a fault condition enabling the solid-state protective system of the present invention to be tested F4.

The ground fault sensing function 24 utilizes the voltage F3 produced by the current sensing function 14 to determine whether a ground fault condition does exist F19 and thereby causing the ground fault timing F20 to be initialized. After sensing a ground fault exceeding a predetermined level for a predetermined period of time, the module trip is caused to be energized, thereby energizing a ground fault indicator F22.

The loss of phase function 28 monitors the voltage produced by the current sensing function 14. Upon the detection of a loss of phase fault F15, a phase loss timing switch F16 is initialized which then causes the supplementary trip switch F18 to trip after a predetermined period of time F17.

The output function 52 monitors the condition of the basic trip switch F14 contained in the overcurrent and timing logic 50 as well as the output of the supplementary trip switch F18 contained in the loss of phase function 28. Upon the detection of a trip signal, relay control transistors F25 deenergize a control relay F26 which in turn controls a contactor F27 which will disconnect the source of power from the load. Additionally, the relay control transistor function F25 will cause an indication F24 to be produced as well as being "locked" F23 into an output condition causing the control relay to maintain the contactor in an open condition until a reset signal F8 is received.

DETAILED DESCRIPTION OF THE CIRCUIT OPERATION

POWER SUPPLY 54

Referring now to FIG. 1, the power supply circuitry 54 is designed to operate continuously from a voltage source which is connected at power supply terminals "A" and "B" and may be, as mentioned, 115/230 volts, at 50/60 HZ depending upon the value of components selected. The stepdown of the available input voltage is accomplished by using capacitor C10 as a voltage dropping device. Resistor R33 is sized so as to provide a discharge path for capacitor C10 while resistor R34 is utilized as a current limiter. Power supply bridge circuit 46 utilizing diodes D18, D19, ZD9 and ZD10, convert the alternating current input voltage from terminals "A" and "B" to direct current, DC. The two Zener diodes ZD9 and ZD10 limit the maximum DC supply voltage. The AC ripple is reduced by smoothing capacitor C9. The supply voltage, $V_K$, directly powers the system comparators MC1, MC2, MC3, MC4, MC5, MC6, MC7 and MC8 as well as operational amplifier OA-1. It should be noted that comparators MC1 through MC8 are part of integrated circuits (IC) where, as noted in Table I, there are four comparators per integrated circuit.

The comparators MC1 through MC8 in the preferred embodiment of the present invention are biased so that when the voltage at the positive input signal terminal is greater than the voltage at the negative input signal terminal the output terminal is in a high impedance state and therefore essentially disconnected from the rest of the circuit, whereas when the voltage at the negative input signal terminal is greater than the voltage at the positive signal input terminal the output of the comparator is electronically connected to the negative power input of the associated integrated circuit which is therefore grounded as shown by the schematics in FIGS. 1 and 1A.

TABLE I

| IC | DESIGNATION | PURPOSE |
| --- | --- | --- |
| IC-2 | MC1 | Ground fault sensing comparator |
| IC-2 | MC2 | Ground fault sensing comparator |
| IC-1 | MC3 | Overcurrent timing switch comparator |
| IC-1 | MC4 | Loss of phase timing switch comparator |
| IC-2 | MC5 | Ground fault timing comparator |
| IC-2 | MC6 | Ground fault trip comparator |
| IC-1 | MC7 | Overcurrent trip comparator |
| IC-1 | MC8 | Supplementary trip switch comparator |
| IC-3 | OA-1 | Buffer |

Additionally powered by the supply voltage, $V_K$, are the trip indicators, light emitting diodes LED1 and LED2, the output circuitry 52, the test circuit 56, and the reference voltage leg. The reference voltages $V_1$, $V_2$ are derived from the supply voltage, $V_K$, utilizing resistor R25, diode D14 and Zener diode ZD6. Therefore, two reference voltages are produced, whereby the first reference voltage $V_1$ produced at the anode of diode D14 determines the overcurrent timing and switch setpoints for comparators MC3 and MC4 (see Table I). The second reference voltage $V_2$ produced at the cathode of Zener diode ZD6 provides the reference signal to the overcurrent trip comparator MC7 between the operational amplifier OA-1 and the output circuitry 52. Two reference voltages are necessary to insure operation at reduced input voltages, which may appear at terminals "A" and "B".

CURRENT SENSOR 14

A three-phase source comprising three lines, L1, L2 and L3, are serially connected through the normally open contacts 16A, 16B and 16C, respectively, in the circuit breaker or motor contactor apparatus 16 to a three-phase load such as, for example, a motor M. Current transformers CT1, CT2 and CT3, which are contained in the protective enclosure 58 (shown in FIG. 5), are disposed on lines L1, L2 and L3 respectively to sample the current used by load M. The current transformers CT1, CT2 and CT3 may be wye connected thereby producing an alternating current which is proportional to the primary current IL utilized by the load M. The alternating current is then rectified to DC current using the three-phase bridge comprising diodes D1, D2, D3, D4, D5 and D6. A varistor V1 provides transient surge protection which may be produced by inputs to the current transformer CT1, CT2 and CT3. The current output of the diodes D1 through D6 is converted to a direct current voltage proportional to the current IL utilized by the load, by the load resistor 22. For any given current, the magnitude of this voltage at 100% of the load M is constant and determined by the resistance of the load resistor 22, whereby the values of resistor R2 and potentiometer P1 are adjusted so as to provide the same voltage across the "+" 42 and "−" 44 terminals, regardless of the size of the load M. Therefore the value of load resistor 22 is essentially chosen to "fit" various loads M, always having the same voltage across its terminals. It is to be understood that the load resistor 22 may be inserted permanently in the associated load protection system circuitry but in the preferred embodiment of the present invention is a module 22, as shown in FIG. 2. The DC output of the three-phase bridge rectifiers D1 through D6 is proportional to the maximum difference between any two of the three phase currents. Therefore, when motor phase currents are equal, the minimum DC voltage of the resulting waveform may be, for example, approximately 0.866 times the maximum DC voltage, and the ripple frequency is 6 times the line frequency. When the load or motor M is experiencing a loss of phase, the DC voltage produced is a DC output waveform which resembles the output of a single phase bridge rectifier. Accordingly, in the preferred embodiment of the present invention, the load resistor module 22 would have a resistance of, for example, 60 to 600 ohms so as to provide a voltage output at the plus and minus terminals 42 and 44 of, for example, 10 volts average for a current IL of a 100% rated load, M.

OVERCURRENT AND TIMING 50

The overcurrent function (see also FIG. 3) provides an overcurrent trip to a contactor based on the current-time ($I^2T$) relationship derived fundamentally from overheating within a load M. Therefore, for currents IL in excess of 115% full load M-current, which may produce, for example, 11.5 volts at the plus terminal 42, the overcurrent circuitry 50 initiates a timeout sequence. The timing speed is dependent upon the amount of overcurrent, (which determines the value of the voltage across the plus and minus terminals 42 and 44, respectively) and, to an extent, current prior to the overcurrent condition.

Essentially, a two-device resistance leg senses the voltage at the + terminal 42 which is proportional to the load M current. Potentiometer P2 permits calibration of the trip set point while capacitor C2 smooths the DC input to the overcurrent timing switch comparator MC3. Should the voltage at the overcurrent timing switch comparator MC3 "+" input exceed the reference voltage V1, the output of the overcurrent timing switch comparator MC3 switches to the "open" state. The purpose of diode D8 is to protect the positive inputs of the overcurrent timing switch comparator MC3 from excessive input voltage.

The values of resistor R9 and potentiometer P2 are adjusted so that the voltage at the positive input terminal of comparator MC3 is greater than the voltage at the negative terminal and therefore the output of the comparator MC3 is in a high impedance state (open) when the load M is greater than 115%. Therefore, with load M less than 115%, timing capacitor C6 would charge up to an initial voltage which is less than the voltage appearing at the plus terminal 42 and may be, for example, not greater than five volts and similarly, during a cold start condition where the load M is not energized the initial voltage at timing capacitor C6 is zero. Upon the occurrence of an overcurrent condition the voltage at the "+" terminal 42 and therefore the positive signal input of comparator MC3 becomes greater than the reference voltage V1 and therefore the negative signal input terminal of comparator MC3. This therefore causes the comparator MC3 to go into a high impedance (open) state. Therefore, capacitor C6 is allowed to charge up via current from diode D10 and resistor R24 to a voltage which approaches the voltage at the positive terminal 42. Therefore, capacitor C6 provides timing as well as representing the thermal capacity of a load such as, for example, the temperature of a motor winding. Additionally, the breakdown voltage of zener diode ZD3 is sized so that upon an overcurrent condition in excess of 140% of rated load zener diode ZD3 will break down allowing current to flow through the ZD3, R22 leg. This, therefore, permits a two-piece exponential approximation of an $I^2T$ timing relationship and therefore a quicker charging rate for capacitor C6. The values of the timing circuit components are calculated so as to provide a trip actuation of approximately nine seconds at 600% full load current M, approximately one minute at 200% full load current and approximately three minutes at 125% full load current. This is graphically represented in FIG. 4. For a given time constant the resistance values of resistors R22 and R24 are chosen so as to be very high in relationship to the value of the capacitance of C6. Additionally, the value of the capacitor C6 is chosen to be very small, since the the principal consideration in selection of the timing capacitor C6 is a low leakage current to capacitance ratio. Therefore, the values of R22 and R24 may be, for example, 11 megohms and 20 megohms, respectively, while the value of the capacitor C6 may be, for example, only 6 microfarads. However, since very small charging currents, which may be in the order of nanoamperes, are used potential leakage paths must be isolated. This is accomplished through a number of components such as resistor R16 which provides the throughput leakage current requirements for the output terminal of the overcurrent timing comparator MC3 and the choosing of a low leakage diode D12 thereby isolating this current source from the timing circuitry 50. Additionally, input bias currents such as that of the overcurrent trip comparator MC7 can affect the timing, and therefore overcurrent trip comparator MC7 is also isolated from the rest of the timing circuit by operational amplifier OA1.

Additionally uncontrolled printed circuit board impedances may affect circuit operation and timing since these impedances may be, for example, on the order of 100 megohms to 1 gigohm and are the result of uncontrolled parameters such as board construction, cleanliness and humidity. Minimizing the effect of these impedances is the guardband 48 which, as mentioned previously, isolates the critical nodes of the timing circuit from adjacent circuit board voltages. The guardband 48 is electrically connected to the neutral reference leg V1 so that neither a comparatively low impedance to ground or a comparatively low impedance to high voltage situation may occur.

During an overcurrent condition when the voltage of capacitor C6 exceeds the reference voltage which is available at the positive terminal of operational amplifier OA1, the overcurrent trip comparator MC7, normally in the high impedance (open) state, goes low thereby grounding the output terminal of MC7 allowing the output function 52 to deenergize the load M. With the output of the comparator MC7 low, resistors R27 and R29 half the voltage at the comparator positive signal input terminal. This action maintains the signal, thereby maintaining a trip condition for the output 52, until the overcurrent condition has cleared whereby the timing capacitor C6 has discharged to less than the voltage it was at 100% of rated load M and is typically, in the preferred embodiment of the present invention five volts. Therefore, reset is delayed for several minutes and may be, for example, in the preferred embodiment of the present invention approximately 1¼ minutes. Diode D10 limits a possible discharge path thereby providing control of the delay interval, while capacitor C8 provides relative immunity to noise transients. Diode D11 and zener diode ZD4 are sized so as to limit the maximum voltage which may appear at the minus signal input terminal of operational amplifier OA1 and which may harm the components therein should the voltage across capacitor C6 exceed a safe level for operational amplifier OA1.

LOSS OF PHASE 28

As mentioned previously when a load M is experiencing a loss of phase, the voltage waveform that appears at the "+" terminal 42 resembles the DC voltage of a single bridge rectifier. The loss of phase timing comparator MC4, by monitoring the voltages across capacitors C1 and C2, senses this changed waveform initiating a time-out for the supplementary trip switch comparator MC8, which also responds to trip signals from external modules.

Under normal three-phase conditions the voltage appearing at the negative signal input terminal of the loss of phasing timing comparator MC4 is equal to the voltage across capacitor C1 and approaches the voltage at the "+" terminal 42 while the voltage appearing at the positive signal input terminal of the loss of phase timing comparator MC4 is equal to the voltage across capacitor C2. Since the current transformers CT1, CT2 and CT3 output is an alternating current, ripple propagates through diodes D1 through D6 such that the voltage at the "+" terminal 42 has some ripple and therefore a maximum and minimum. It is this maximum voltage at 100% of rated load M that the voltage at the negative signal input terminal of the comparator MC4 approaches. The minimum voltage is now low enough to permit discharge of the peak sensing capacitor C1 through diode D7. However under loss of phase conditions, the minimum voltage drops to near ground potential, thereby allowing capacitor C1 to discharge through diode D7 more quickly than the voltage across capacitor C2 will drop and is below the voltage sensed by the overcurrent and timing function 50. Therefore, the voltage appearing at the positive signal input terminal of the loss of phase timing control comparator MC4 is greater than the voltage at the negative signal which is equal to the voltage across input terminal of comparator MC4, hence causing the output of comparator MC4 to go to a high impedance state and therefore open. Zener diode ZD1 protects the comparator MC4 negative signal input terminal from excessive voltage. Resistor R12 biases the comparator MC4 on under zero current conditions.

With the output of loss of phase timing comparator MC4 open, timing capacitor C5 is charged by the voltage which appears at the "+" terminal 42. The time from loss of phase detection until actual tripping to the output circuit is to an extent dependent on the magnitude of the current of the remaining phase or phases. The trip time is established by resistor R15 which is sourced from the power supply at voltage $V_K$. If loss of phase current should increase, timing is accelerated by the resistor R17-diode D9 charging leg. For loss of phase currents 50% of rated load M, trip time may be, for example, typically 30 seconds, while a loss of phase at 100% of rated load M, current trip time may be, for example, typically 20 seconds. Additionally, capacitor C5 serves as a trip capacitor for external modules which may be connected to the T-terminal by instantaneously charging to a voltage in excess of the voltage appearing at the positive signal input terminal of supplementary trip switch comparator MC8. When in the non-trip or normal mode, the voltage appearing at the positive signal input terminal of the supplementary trip switch comparator MC8 is equal to the voltage drops of D17, ZD7 and the base emitter junction of transistor T2. Therefore, when the voltage across capacitor C5 and therefore the voltage appearing at the negative signal input terminal of supplementary trip switch comparator MC8 exceeds the voltage drop due to diodes D17, ZD7 and transistor T2, comparator MC8 output normally in a high impedance (open) state, goes low thereby grounding the output terminal. This provides a trip signal to the output stage 52. Upon the generation of the trip signal, the voltage at the positive signal input terminal of comparator MC8 is reduced to the voltage drop of diode D17, and is typically 0.6 volts. This reduction in voltage at the positive terminal of comparator MC8 maintains the trip signal until the trip condition has cleared and the timing capacitor C5 has discharged to less than the voltage drop of diode D17. The delay of the voltage drop is also controlled by the value of resistor R21 such that the higher the value the longer the delay and may be such that when R21 is at, for example, 910 kilohms a delay of 1.25 minutes will result whereas, for example, when resistor R21 is selected to have a lower value such as 15 kilohms reset is not delayed at all, but in effect instantaneous.

GROUND FAULT 24

Referring now to FIG. 1A there is shown a schematic diagram of the ground fault function 24. It is to be understood that the ground fault function 24 may be integrated with the circuitry in the load protection system circuitry proper but in the preferred embodiment of the present invention is a module 24, shown in FIG. 2 and which is insertable as shown in FIG. 5. In the absence of a ground fault the phase currents in line conductors L1, L2 and L3 shown in FIG. 1 are equal in magnitude and 120° out of phase. The DC output of the current sensor 14 has a ripple magnitude of approximately 14% at a ripple frequency of approximately six times the frequency of the source and in the preferred embodiment of the present invention is approximately 60 Hz producing a ripple frequency of 360 Hz. Additionally, in the absence of a ground fault in the load M, the vector sum of the load phase currents and hence the vector sum of the transformer secondary current in the neutral leg GF shown in FIG. 1, is equal to zero. Therefore current does not flow through resistor R1 and the voltage drops across resistors R2 and potentiometer P1 can be made equal (see FIG. 1). When a ground fault does occur, the vector sum of the three load M phase currents is no longer equal to zero. The result is that a residual current will flow through resistor R1 of FIG. 1 to the neutral leg GF. Coincident with the presence of current in resistor R1 is an unequal current flow through resistor R2 and potentiometer P1. It is to be understood that resistor R1 may be, for example, a short circuit since its primary purpose is to provide a current path in the neutral leg during ground fault conditions. During a ground fault condition, current will flow through resistor R1 and the voltage across R2 will be different than the voltage across potentiometer P1. Therefore, the potential voltage level of the GF terminal will no longer be approximately half the voltage of the "+" and "−" terminals 42, 44. With the potential voltage level of the GF terminal less than half the voltage at + and − terminals 42 and 44, the voltage at the negative signal input terminal of ground fault sensor comparator MC1 will be greater than the voltage at the positive terminal of comparator MC1 with the result that the output signal terminal of comparator MC1 will be grounded. With the potential voltage level of the GF terminal greater than half the voltage at + and − terminals 42 and 44, the voltage at the negative signal input terminal of the ground fault sensor comparator MC2 will be greater than the voltage at the positive input signal terminal of comparator MC2, and the output signal terminal of comparator MC2 will be grounded. The grounded output signal terminal of comparator MC1 or MC2 will cause capacitor C3 which is normally charged up to essentially voltage $V_K$ to discharge to ground. Therefore, ground fault timing comparator MC5 which will have a voltage at the positive signal input terminal which is essentially equal to the breakdown voltage of zener diode ZD2 will be greater than the potential of the negative signal input terminal. Accordingly, the output of comparator MC5 will therefore be in a high impedance state or open. This will allow capacitor C4 to charge up to a level which is in excess of the breakdown voltage of zener diode ZD2 and therefore the positive signal input terminal of ground fault timing comparator MC6 will be greater than the voltage level of the negative signal input terminal of comparator MC6. Therefore the output signal terminal of MC6 will be in a high impedance state (open). This will allow the voltage $V_K$ at the K terminal to permit current flow through diode D15 to the trip terminal T, thereby causing the supplementary trip switch comparator MC8 of FIG. 1 to initiate a trip sequence and deenergize the load M. The value of zener diode ZD5 is sized to ensure initiation of the trip sequence. Zener diode ZD5 must have a breakdown voltage greater than the voltage appearing at the positive signal input terminal of the supplemental trip switch comparator MC8. Applied voltage in excess of the breakdown voltage of ZD5, causes the gate of silicon controlled rectifier SC1 to fire thereby allowing current to pass therethrough permitting light emitting diode LED1 to indicate that a ground fault trip has occurred. Reset of the protective system occurs as described below and is either automatic or manual.

During the normal mode when no ground fault is present the output of ground fault timing comparator MC6 is grounded thereby essentially shorting the voltage $V_K$ which has passed through resistor R23 to ground which therefore does not permit current to flow through diode D15 or zener diode ZD5, removing power from the gate of SC1. Additionally in the reset mode upon the opening of the momentary contact of switch SW1, voltage is removed from the K terminal thereby stopping the flow of current through silicon controlled rectifier SC1 and turning LED1 off. Potentiometer P3 determines what percentage of ground fault current is permissible before allowing comparators MC1 or MC2 to change state. Additionally, zener diode ZD2 determines the voltage level and hence the percent of motor load, IL, at which ground fault timing level comparator MC5 will be enabled.

TEST FEATURE 56

Figure 4:
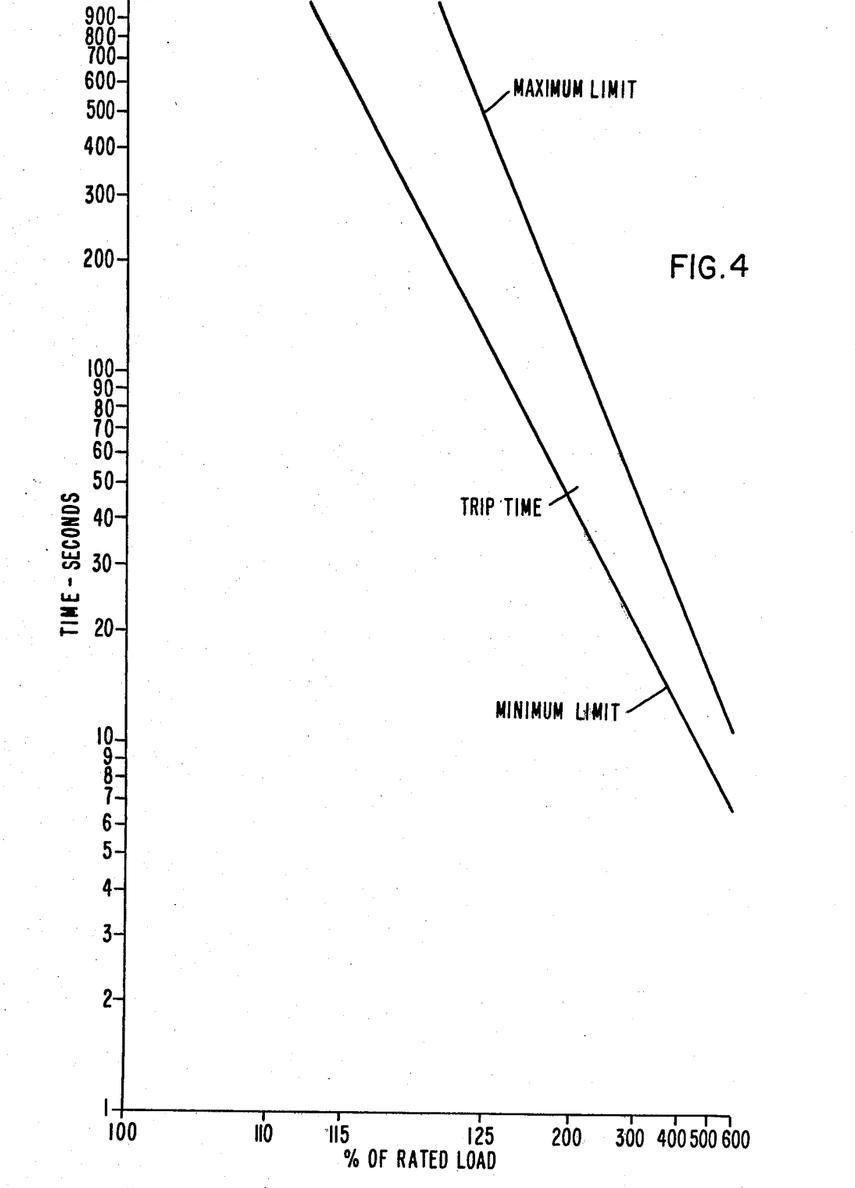
FIG. 4 is a graphical representation of the percent of overload current versus time characteristics necessary to cause trip out of the electrical system or circuit.

The test function 56 allows the overcurrent and timing function 50 to be tested in the absence of a load M experiencing an overcurrent condition or the use of external test arrangements. Resistor R14 is sized so that during the normal quiescent current monitoring mode when the load M is not in an overcurrent condition, the effect of the addition of the resistance of R4 is minimized. This is due to the low impedance of the load resistor 22, which as mentioned previously may be in the order of 60 to 600 ohms. Upon the removal of the rating plug 22 and any other modules such as those shown in FIG. 2, the impedance of the current sensing function 14 increases to a value, approximately, 5.5 times that of resistor R14. Since resistor R14 is sourced from the power supply voltage $V_K$, the voltage appearing at the "+" terminal 42 is in excess of the voltage which would appear at the load resistor 22 when the load M is at 100% of rated current. This therefore simulates an overcurrent condition thereby causing the overcurrent and timing function 50 to begin to initiate a time-out sequence. This sequence proceeds in the same manner as that mentioned previously under an actual overcurrent condition. The resistor R14 is sized so as to simulate a 125% full load motor current M, thereby causing the load M to disconnect from the source in approximately three minutes as shown in FIG. 4. Reenergization of the load M is accomplished in the output function 52 and will continue to cause a trip-out thereby deenergizing the load M, until the load resistor module 22 is reinserted into the load protection system.

OUTPUT 52

Upon the generation of a trip signal from either the overcurrent and timing circuit 50, loss of phase 28 or the appearance of a trip signal at the T-terminal, such as from the ground fault circuitry 24 the relay control transistor T2 and hence the output relay RE1 is deenergized, thereby deenergizing the load M. Coincident with the deenergizing of relay RE1 the LED indicator LED2 and lock circuit transistor T1 are energized. Strap-switch S1 dictates whether the unit resets automatically or requires a manual reset, in that the source of voltage to the base of relay control transistor T2 is serially connected through switch S1.

In the normal, energized state, when power is supplied to the load M, the base current for relay control transistor T2 is supplied by resistor R31 and zener diode ZD7. With transistor T2 on, the control relay RE1 is energized thereby retaining its normally open contacts closed. With transistor T2 in saturation, the base drive of lock control transistor T1 is shunted to ground via diode D20 which thereby keeps light emitting diode LED2 off. The transistor T1 base resistor R36 ensures the state of transistor T1 when transistor T2 is conducting.

Should the overcurrent trip comparator MC7 or the supplementary trip switch comparator MC8 output terminals go low thereby grounding, the base drive to the relay control transistor T2 is shorted to ground. The use of diode D16 ensures that the level of voltage necessary to change the state of the operational amplifier OA1 and therefore the state of overcurrent trip comparator MC7 is unaffected by a state change in the output circuitry 52. This action therefore permits the comparator MC7 or MC8 that initiated the trip to control the duration of the time delay before reset. The automatic-manual switch S1 may be either a single-pole double-throw switch or a point of internally strapping connections in the schematic of FIG. 1 and in the preferred embodiment of the present invention is a point for strapping connections. In the manual configuration, the time before reset after deenergization of the relay RE1 can be either instantaneous for trip conditions initiated by the supplementary trip switch comparator MC8 or longer such as, for example, 1.25 minutes for trips initiated by the overcurrent trip comparator MC7. The purpose for the delay before reset when an overcurrent trip occurs is so as to enable the load M to cool down after an overheating condition. During the operation of the relay RE1, diode D21 prevents semiconductor damage to associated components. During the time that relay control transistor T2 is off, base drive current for lock control transistor T1 is supplied by resistor R35, allowing transistor T1 as well as the LED indicator LED2 to turn on. Zener diode ZD8 provides a secondary conduction path should indicator LED2 fail. In the manual configuration this action is self-maintaining, such that the base drive current for relay control transistor T2 is sourced from the voltage drop at the junction of current limiting resistor R30 and the anode of LED2. Zener diode ZD7 and the T2 base resistor R32 ensure that the trip state is maintained until power to the output circuitry 52 is interrupted using the momentary contact switch SW1. If prior to switch SW1 actuation both the overcurrent trip comparator MC7 and the supplementary trip switch MC8 are not in a trip condition, upon the restoration of power the base drive current to transistor T2 will be restored and hence output relay RE1 will be energized closing its contacts. If either comparator MC7 or MC8 is in the trip state when the switch SW1 is depressed, then transistor T2 base drive current will again be shunted to ground thus keeping the output relay RE1 deenergized, maintaining transistor T1 and LED2 on. Zener diode ZD11 disables the LED indicator LED2 and lock control transistor T1 when power supply voltage $V_K$ is less than approximately 75% of the breakdown voltage of zener diodes ZD9 or ZD10. This ensures that when power is applied, the unit does not come up in the trip state unless the necessary reset delay times have not expired. Capacitor C11 reduces the noise susceptibility of the unit.

In the automatic mode of strap S1, base drive current for relay control transistor T2 is sourced from the power supply voltage $V_K$. When the state of any trip comparators MC7 or MC8 return to the normal, off condition, then base drive current is restored to transistor T2 without operator action, thereby energizing control relay RE1 and closing the normally open contacts associated with it, and turning off of transistor T1 and LED indicator LED2.

It is to be understood that the present invention may control loads other than motors such as transformers or power supplies without departing from the spirit and scope of the present invention. Additionally, it is to be understood that a circuit breaker may be utilized in place of the contactor or that the output may initiate an audible and, or a visual alarm in place of or in conjunction with the contactor. Further, it is to be understood that the comparators contained in the integrated circuits may be arranged in different combinations on integrated circuits or combined into a larger integrated circuit or may be discrete devices. Additionally, the level or duration of fault conditions before initiating trip-out may be raised or lowered. Also, other modules not mentioned explicitly may utilize the module arrangement and may include, for example, long acceleration modules, phase imbalance modules which utilize the pin placement arrangement of the present invention.

Therefore, in addition to the above-enumerated advantages, the disclosed invention produces a load protection system which is compact, providing modular growth capabilities, while achieving a comprehensive effective load protection system. Additionally, the described invention provides a load protection system which closely coordinates load protection with the detection of fault conditions.

What we claim is:

1. A load protection system, comprising:
   sensor means for sensing circuit current in an electrical circuit, said sensor means having a neutral leg and a pair of output terminals, said output terminals providing an output signal thereat which is related to said circuit current;
   a pair of resistive elements in serial circuit relationship with each other, connected across said output terminals;
   a third resistive element connected at one end between said pair of resistive elements and at the other end to said neutral leg;
   ground fault sensing means connected across said output terminals and to said neutral leg for producing a trip signal upon detecting a current flow in said third resistive element during a ground fault; and
   circuit control trip means connected to said ground fault sensing means and to said electrical circuit for opening said electrical circuit when said trip signal is provided.

2. A device according to claim 1 wherein said resistive elements are resistors.

3. A device according to claim 1 wherein said sensor means is comprised of a current transformer.

4. A device according to claim 1 wherein a unidirectional voltage means is connected to said sensor means thereby providing a unidirectional voltage related to said circuit current.

5. A device according to claim 4 wherein said unidirectional voltage means is a diode.

6. A device according to claim 1 wherein a contactor having separable contacts is serially disposed in said electric circuit.

7. A load protection system, comprising:
   sensor means for sensing circuit current in an electrical circuit, said sensor means having a neutral leg and a pair of output terminals, said output terminals providing an output signal thereat which is related to said circuit current;
   a pair of resistive elements in serial circuit relationship with each other, connected across said output terminals;
   a third resistive element connected at one end between said pair of resistive elements and at the other end to said neutral leg;
   ground fault sensing means connected across said output terminals and to said neutral leg for producing a trip signal upon detecting a voltage across said third resistive element during a ground fault; and
   circuit control trip means connected to said ground fault sensing means and to said electrical circuit for opening said electrical circuit when said trip signal is provided.

8. A device according to claim 7 wherein said resistive elements are resistors.

9. A device according to claim 7 wherein said sensor means is comprised of a current transformer.

10. A device according to claim 7 wherein a unidirectional voltage means is connected to said sensor means thereby providing a unidirectional voltage related to said circuit current.

11. A device according to claim 10 wherein said unidirectional voltage means is a diode.

12. A device according to claim 7 wherein a contactor having separable contacts is serially disposed in said electric circuit.

13. A load protection system, comprising:
   sensor means for sensing circuit current in an electrical circuit, said sensor means having a neutral leg and a pair of output terminals, said output terminals providing an output signal thereat which is related to said circuit current;
   a pair of resistive elements in serial circuit relationship with each other, connected across said output terminals;
   a third resistive element connected at one end between said pair of resistive elements and at the other end to said neutral leg;
   ground fault sensing means connected across said output terminals and to said neutral leg for producing a trip signal upon detecting unequal voltages across said pair of resistive elements during a ground fault condition; and
   circuit control trip means connected to said ground fault sensing means and to said electrical circuit for opening said electrical circuit when said trip signal is provided.

14. A device according to claim 13 wherein said resistive elements are resistors.

15. A device according to claim 13 wherein said sensor means is comprised of a current transformer.

16. A device according to claim 13 wherein a unidirectional voltage means is connected to said sensor means thereby providing a unidirectional voltage related to said circuit current.

17. A device according to claim 16 wherein said unidirectional voltage means is a diode.

18. A device according to claim 13 wherein a contactor having separable contacts is serially disposed in said electric circuit.

19. A load protection system, comprising:
sensor means for sensing circuit current in an electrical circuit, said sensor means having a neutral leg and a pair of output terminals, said output terminals providing an output signal thereat which is related to said circuit current;
a pair of resistive elements in serial circuit relationship with each other, connected across said output terminals;
a third resistive element connected at one end between said pair of resistive elements and at the other end to said neutral leg;
ground fault sensing means connected across said output terminals and to said neutral leg for producing a trip signal as a function of the electrical status of said third resistive element during a ground fault; and
circuit control trip means connected to said ground fault sensing means and to said electrical circuit for opening said electrical circuit when said trip signal is provided.

20. A device according to claim 19 wherein said resistive elements are resistors.

21. A device according to claim 19 wherein said sensor means is comprised of a current transformer.

22. A device according to claim 19 wherein a unidirectional voltage means is connected to said sensor means thereby providing a unidirectional voltage related to said circuit current.

23. A device according to claim 22 wherein said unidirectional voltage means is a diode.

24. A device according to claim 19 wherein a contactor having separable contacts is serially disposed in said electric circuit.

25. A load protection system, comprising:
sensor means for sensing circuit current in an electrical circuit, said sensor means having a neutral leg and a pair of output terminals, said output terminals providing an output signal thereat which is related to said circuit current;
a pair of resistive elements in serial circuit relationship with each other, connected across said output terminals;
a third resistive element connected at one end between said pair of resistive elements and at the other end to said neutral leg;
ground fault sensing means connected across said output terminals and to said neutral leg for producing a trip signal as a function of the electrical status of said pair of resistive elements during a ground fault; and
circuit control trip means connected to said ground fault sensing means and to said electrical circuit for opening said electrical circuit when said trip signal is provided.

26. A device according to claim 25 wherein said resistive elements are resistors.

27. A device according to claim 25 wherein said sensor means is comprised of a current transformer.

28. A device according to claim 25 wherein a unidirectional voltage means is connected to said sensor means thereby providing a unidirectional voltage related to said circuit current.

29. A device according to claim 28 wherein said unidirectional voltage means is a diode.

30. A device according to claim 25 wherein a contactor having separable contacts is serially disposed in said electric circuit.

31. An electrical motor protection device, comprising:
sensor means for sensing circuit current in an electrical circuit, said sensor means having a neutral leg and a pair of output terminals, said output terminals providing an output current thereat which is related to said circuit current;
replaceable resistive load means connected in parallel circuit relationship with said output terminals of said sensor means for converting said output current into a voltage;
second resistive element means connected at one end to a point which is the approximate mid-value resistance of said replaceable resistive load means and at the other end to said neutral leg and said sensor means;
ground fault sensing means connected across said output terminals and to said neutral leg for detecting current flow in said second resistive element during a ground fault condition thereby providing a trip signal; and
circuit control trip means connected to said ground fault sensing means and to said electrical circuit for opening said electrical circuit when said trip signal is provided.

32. A device according to claim 31 wherein said resistive load means comprises two resistive elements of generally equal resistive value connected in serial circuit relationship with each other thereby allowing said second resistive element to conduct current thereby producing unequal voltages across said pair of resistive elements during a ground fault condition.

33. A device according to claim 32 wherein said resistive elements are resistors.

34. A device according to claim 31 wherein said sensor means is comprised of a current transformer.

35. A device according to claim 31 wherein a unidirectional voltage means is connected to said sensor means thereby providing a unidirectional voltage related to said circuit current.

36. A load protection system, comprising:
sensor means for sensing circuit current in an electrical circuit, said sensor means having a neutral leg and a pair of output terminals, said output terminals providing an output signal thereat which is related to said circuit current;
a pair of resistive elements in serial circuit relationship with each other, connected across said output terminals;
a conductive element connected at one end between said pair of resistive elements and at the other end to said neutral leg;

ground fault sensing means connected across said output terminals and to said neutral leg for producing a trp signal upon detecting a current flow in said third resistive element during a ground fault; and circuit control trip means connected to said ground fault sensing means and to said electrical circuit for opening said electrical circuit when said trip signal is provided.

37. A device according to claim 36 wherein said conductive element is comprised of a resistor.

38. A device according to claim 36 wherein said conductive element has relatively high electrical conductivity.

* * * * *